Nov. 2, 1971   S. A. WIRFELT   3,616,507
MILLING CUTTER

Filed July 10, 1969   2 Sheets-Sheet 1

Nov. 2, 1971 S. A. O. WIRFELT 3,616,507
MILLING CUTTER
Filed July 10, 1969 2 Sheets-Sheet 2

United States Patent Office 3,616,507
Patented Nov. 2, 1971

3,616,507
MILLING CUTTER
Sven Axel Olof Wirfelt, Sandviken, Sweden, assignor to Sandvikens Jernverks Aktiebolag, Sandviken, Sweden
Filed July 10, 1969, Ser. No. 840,685
Claims priority, application Sweden, July 12, 1968, 9,598/68
Int. Cl. B26d 1/00
U.S. Cl. 29—105
16 Claims

ABSTRACT OF THE DISCLOSURE

In a milling cutter, more particularly a multiple-insert milling cutter, the removably clamped inserts are not locked in recesses but are retained in recesses solely by spring means. Side edges of the inserts rest against fixed location members in the recesses and are pressed against said members by cutting forces arising from use of the tool.

---

This invention relates to milling cutters of the type using removably clamped cutting inserts, and is concerned with improvements in means for securing such inserts in such tools.

In connection with milling cutters, and, more exactly, multiple-insert milling cutters, having removably clamped inserts it is of greatest importance inter alia in flat face milling, that the inserts can be positioned with great accuracy so that a sufficiently good surface finish of the workpiece is achieved. In the use of milling cutters with soldered inserts, sufficient precision is obtained by grinding the inserts after the inserts have been mounted in the cutter body. On the other hand, in the use of mechanically clamped inserts (which are to be preferred from an economic point of view), very exact means for the positioning are necessary, but certain principal difficulties are encountered especially in milling cutters with a great number of inserts in relation to the diameter.

Inter alia in three respects up to now there have been difficulties in constructing facemills with closely placed inserts (close toothing), in which the positioning of the inserts is done in a simple and swift way and with great accuracy.

Thus, troublesome stresses are often generated in the cutter body of a milling cutter with very close tooth pitch, which stresses decrease the axial accuracy. Generally, some kind of wedge device is used in clamping the inserts, and during practical working conditions it is difficult to prevent the wedges from becoming unequally tightened with resulting deformation of the cutter body. It is, also, often difficult to avoid that the wedges become unnecessarily firmly clamped, particularly if less skilled labour is used.

Again, the handling of facemills when changing inserts is time-consuming in comparison with the regrinding of a milling cutter with soldered inserts (since the last-mentioned operation is now done as a rule in more or less automatic machines). Each insert is generally clamped by a wedge, which has to be loosened and tightened for every change of insert.

Finally, in hitherto existing constructions, a certain skill in craftsmanship is required for proper positioning of the inserts in the cutter body. Before the clamping, all the inserts have to be carefully positioned in contact with the intended support-points. It is sufficient, that one single insert of a large cutter body be incorrectly positioned in order to spoil the work.

It is an object of the present invention to provide a simple solution of above related and other problems in milling cutters with clamped inserts.

According to the present invention, the inserts are not locked in recesses in the cutter body—as earlier has been customary—but rather are retained in the recesses exclusively by spring means which develop enough holding force to counteract the centrifugal forces arising during the rotation of the milling cutter but which permit the insert to be moved parallel to its support surface—consisting of a bottom surface in the recess—under the influence of the cutting forces. This clamping device admits the use of a support for the side edges of the insert, consisting of location members in the recess preferably in the form of small support surfaces or support points. When performing finish cuts, i.e., cutting with small cutting depth, the insert is automatically located against the same surfaces or points on the side edges of the insert, as also are used as support points when grinding the insert. In this way an exact position of the inserts is obtained in the finish cutting independent of the accuracy by which the inserts have been mounted in the cutter body.

Another advantage of the present clamping device is that the device can be made easily accessible, for instance, from the back of the cutter body, in such a way that it is possible to loosen and clamp the inserts, one at a time or all at the same time, by a simple device.

In the milling cutter of the present invention the cutter body is provided with recesses for removably placed inserts, each insert has two opposite, substantially plane, end faces and side edges between them. The invention is characterized in that each insert is arranged to be held against a support surface of the recess exclusively by a spring device in the cutter body, one end of the spring device being adapted to be in contact with one of the end faces of the insert, two side edges of the insert being intended to rest against edge supports or location members, in the recess, so arranged in the recess that the insert is pressed against the edge supports by means of the cutting forces arising in the use of the tool. Furthermore, the spring device may act on the insert in the direction towards the location members in the recess.

For contacting one end face of the insert, the spring device may be shaped with a wedge which, for instance, may be connected to a pull rod which co-operates with a spring.

The spring device preferably is so shaped that its holding force against the insert exceeds the centrifugal force which acts upon the insert during the rotation of the milling cutter when in use but is essentially weaker than that of the cutting force acting on the insert during use.

In the following the invention will be described in connection with the attached drawings in which FIG. 1 shows a part of a milling cutter in perspective with inserts mounted, FIGS. 2 and 3 show a part of the same milling cutter in side-view, respectively in section;

Figure 1:
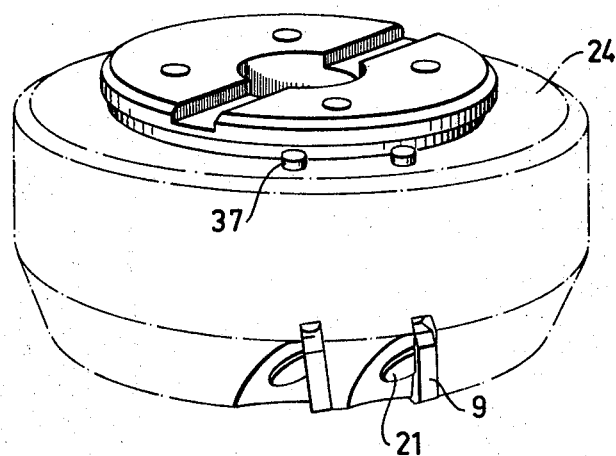
Figure 2:
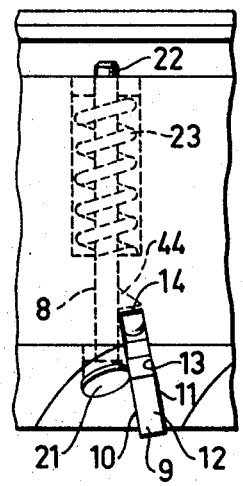
Figure 3:
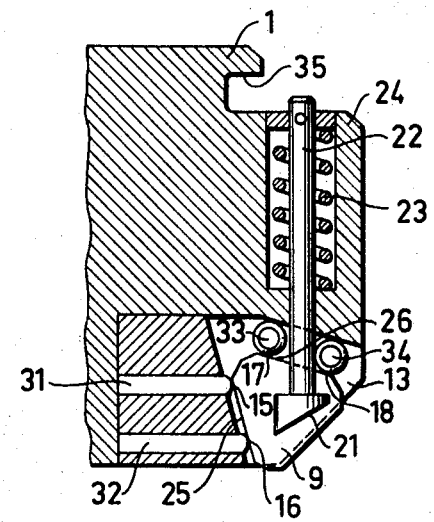

The embodiment shown in FIGS. 1-3 includes the cutter body 1 with recesses 14 intended for inserts 9, which inserts preferably have plane end faces 10 and 11 and between these faces side edges 12. The inserts may have essentially triangular shape as shown or other suitable shape, for instance pentagonal form.

The insert 9 is placed in the recess 14, where it is held against the supporting surface 13 by a spring device, which in the shown embodiment includes a wedge-shaped device 21, a pull rod 22 connected with the wedge-shaped device and a spring, i.e. a coil spring 23. The spring device can naturally be made in many ways, and the spring may have the form of a plate spring, and can for example be placed on the back 24 of the cutter body.

According to the embodiment shown, the insert is held by means of the spring 23, which clamps the insert 9 against the supporting surface 13 via the pull rod 22 and the wedge-shaped device 21, which device is in close contact with the end face 10. The spring device has in this case a direction of movement essentially parallel to the main axis of the milling cutter. By its locating and by the direction of movement of the spring device, a certain action of the insert in the direction towards one or more edge supports in the recess may be obtained. But it is essential that the spring device clamps the inserts with a force which exceeds the centrifugal force, which acts upon the insert during the rotation of the milling cutter at the use, but is essentially less than the cutting force acting on the insert during said use.

As is evident from FIG. 3, two or more edge supporting surfaces or supporting points 15, 16, 17 and 18, for the side edges 25 and 26 of the insert, are arranged in the recess 14. The edge supporting surfaces may be formed on certain pins 31 and 32, or constitute parts of balls 33 and 34, cylinders or the like, and be more or less point- or line-formed. Other forms also are possible—for instance, contact planes. It can often be suitable to make the location members of sintered tungsten carbide or other hard and wear-resistant material.

Figure 4:
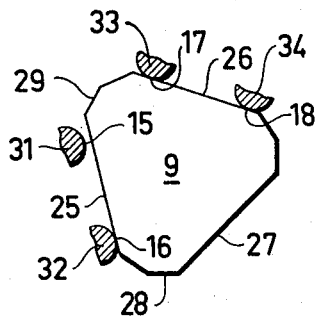
FIGS. 4-7 show the applicable principle of the positioning of the insert.
Figure 5:
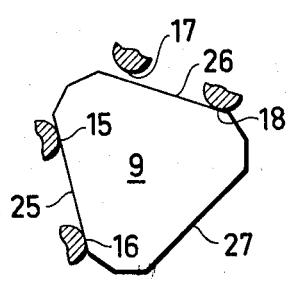
Figure 6:
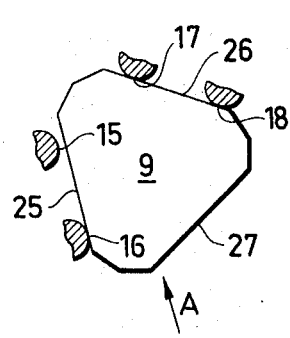
Figure 7:
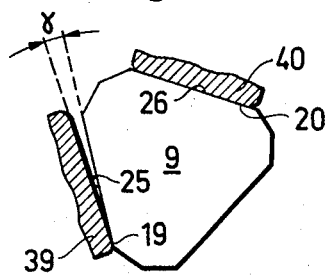

FIGS. 4–7 show the principles for positioning the insert. As is evident from these figures, the location members are intended as supports for the side edges 25, 26 of the insert, arranged in two main directions 15, 16 (FIGS. 4–6) and 19 (FIG. 7) respectively 17, 18 (FIGS. 4–6) and 20 (FIG. 7). These two main directions, which in the embodiment according to FIGS. 4–6 are defined by the connecting line between the two small edge supporting surfaces or points 15, 16 respectively 17, 18 form an acute angle with each other. The said acute angle between the connecting lines is somewhat smaller than the angle between the supported side edges 25, 26 of the insert. By this angular deviation between the side edges of the insert and the edge supporting surfaces or the connection lines between the small edge supporting surfaces or points one insures that the insert will be in close contact with the edge supporting surfaces or points 16 and 18, but only with one of the edge supporting surfaces or points 15 and 17.

When the cutting forces during finish cutting with small cutting depth are acting against the lower part of the main cutting edge and the chamfer formed between one end face 10 and side edges 27, 28 of the insert, there is attained, a resultant force which, in principle, is directed according to the arrow A in FIG. 6. Owing to this the insert is moved, so that contact against the edge supporting surface or points 17, 18 is obtained. The edge supporting surfaces or points 17, 18 correspond to the support points which are used in the grinding of the insert, and the desired high accuracy in finishing is accordingly attained.

In rough machining with larger cutting depth the cutting forces lie differently, so that the side edge 25 of the insert may be pressed against the edge support 15—as is evident from FIG. 5. Owing to this the accuracy will be less, but this fact does not play any essential role in rough machining.

According to the embodiment shown in FIG. 7, only one edge support 39, 40 with one more or less elongated edge supporting surface or plane of contact 19, 20, has been arranged in each of the two main directions, which form an angle with each other. The principle for the positioning of the insert is in all essential alike what has been earlier described.

As mentioned before, the angle between the two main directions of the location members is smaller than is the angle between the supported side edges of the insert. The angular difference ($\gamma$ in FIG. 7) is as a rule at the most 2° and normally is between 1° and ¼°, for example about ½°.

The spring device ought to be so arranged in the cutter body that it is easily influenced from outside in order to loosen and clamp the insert. This should suitably be done on a part at some distance from that member of the spring device which clamps the insert. Thus the pull rod 22, placed in the spring device, may be uncovered at the back 24 of the cutter body and, for instance, project with a small part 37, at the push of which, against the spring force, the wedge 21 will be relieved from the insert.

The spring device may furthermore be provided with a special shoulder 44 which is arranged to press the insert in the direction outwardly from the recess 14 by influence on the spring device in order to loosen the insert 9. The shoulder 44 may then be arranged (for example) on the pull rod 22.

Figure 8:
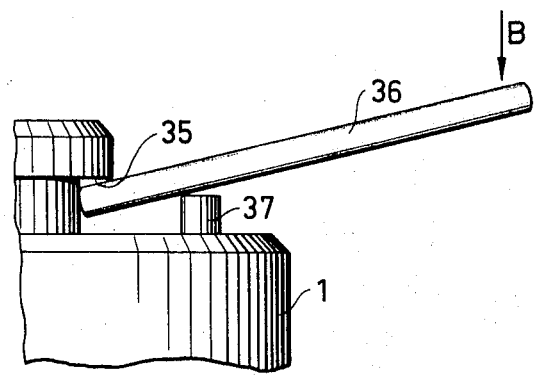
FIGS. 8-10 show alternative devices for loosening and clamping the inserts.
Figure 9:
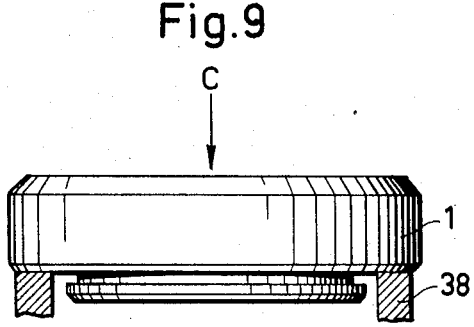
Figure 10:
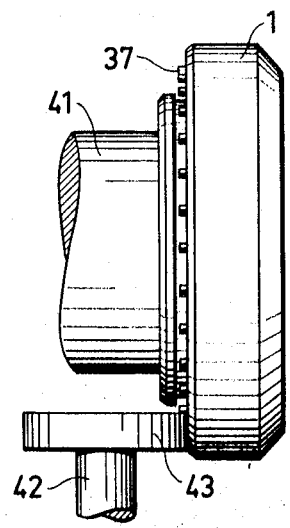

FIGS. 8–10 show embodiments of some different means for loosening and clamping the inserts. For loosening the inserts, one at a time, a lever 36 may be used. The lever is located in a recess 35 in the cutter body 1, and is brought to work upon the pull rod 37 by means of a pressure in the direction of the arrow B. If it is desirable to loosen all the inserts at the same time, the milling cutter may be placed on an annular support 38 (FIG. 9), whereupon a pressure according to the arrow C is applied in the center of the cutter body. In this way all the pull rods are pressed inwardly simultaneously and the inserts can be changed. An alternative embodiment is shown in FIG. 10, according to which cutter body 1 is mounted on a spindle 41 which is fed backwards, so that the disk 43 is pressed against the back of the cutter body. The disk is mounted on an axis 42 normal to the cutter spindle and is positioned so that its mantle surface covers the pull rods 37 in the cutter body. When the cutter body 1 is rotated, the inserts are loosened and clamped one after another.

I claim:
1. A milling cutter which comprises a cutter body
within the cutter body a plurality of recesses spaced about the circumference of said cutter body, each said recess having a support surface;
location members fixed within said recesses for supporting a cutting insert in each said recess;
a plurality of cutting inserts each having two opposite end surfaces, the faces of which are substantially plane, with side edges between them, each said insert normally being positioned in one of said recesses in contact with said support surface and with two of its side edges in contact with a plurality of said location members;
in said cutter body a plurality of spring devices, each including a spring means, constituting the sole means whereby said cutting inserts are maintained against said support surfaces in said recesses, one part of each of said spring devices being a wedge-shaped clamping member which normally is in contact with and pressed against one of said end surfaces of said insert, said clamping member being displaceable by the action of said spring means along at least a part of the aforesaid contacted end face of said insert, the direction of movement of said spring means forming a small angle with the plane of the contacted side edge of said insert.

2. Milling cutter according to claim 1, in which said spring device is arranged to move substantially parallel with the axis of rotation of the milling cutter.

3. Milling cutter according to claim 1, in which each spring device for holding the insert is so formed that its holding force exceeds the centrifugal force acting upon the insert during the use of the milling cutter but is essentially less than is the cutting force acting on the insert during said use.

4. Milling cutter according to claim 1, in which said wedge-shaped device is connected with a pull rod which is easily influenced by means of a spring.

5. Milling cutter according to claim 1, in which said spring device is so arranged in the cutter body that it is influenced from outside on a part thereof which is at some distance from the member clamping the insert.

6. Milling cutter according to claim 4, in which an end of said pull rod included in the spring device, is exposed at the back of the cutter body.

7. Milling cutter according to claim 4, in which said pull rod included in the spring device, projects outside the back of said cutter body, so that at a push of the rod the wedge will be relieved from said insert.

8. Milling cutter according to claim 1, in which the location members in each of said two main directions are composed of two small supporting surfaces or support points.

9. Milling cutter according to claim 1, in which the side edges of the insert are arranged to be supported against two edge supporting surfaces in one of said two main directions and one support surface in the other direction.

10. Milling cutter according to claim 1, in which the location members have the form of contact planes.

11. A milling cutter which comprises a cutter body
a recess within the cutter body, said recess having a support surface;
location members fixed within said recess for supporting a cutting insert in said recess, said location members situated in two main directions;
a cutting insert having two opposite, substantially plane end faces with side edges between them, said insert normally being positioned in said recess in contact with said support surface and with two of its side edges in contact with and normally supported by a plurality of said location members; and
a spring device, in said cutter body, constituting the sole means whereby said cutting insert is maintained against said support surface in said recess, one part of which spring device is a clamping member which normally is in contact with and pressed against one of said end faces of said insert,
the angle between said two main directions of said location members being smaller than is the angle between the supported side edges of said insert.

12. Milling cutter according to claim 11, in which the angular difference γ is at the most 2°.

13. Milling cutter according to claim 12, in which the angular difference γ is between 1° and ¼° and preferably is about ½°.

14. A milling cutter which comprises a cutter body
a recess within the cutter body, said recess having a support surface;
location members fixed within said recess for supporting a cutting insert in said recess;
a cutting insert having two opposite, substantially plane end faces with side edges between them, said insert normally being positioned in said recess in contact with said support surface and with two of its side edges in contact with a plurality of said location members;
a spring device, in said cutter body, constituting the sole means whereby said cutting insert is maintained against said support surface in said recess, one part of which device is a clamping member which normally is in contact with and presses against one of said end faces of said insert, said spring device being provided with a special shoulder which, in order to loosen the insert, is so arranged as to press the insert in the direction out from the recess by means of said spring device.

15. Milling cutter according to claim 14, in which said shoulder is arranged on the pull rod being an integral part of the spring device.

16. A milling cutter which comprises a cutter body
within the cutter body a plurality of recesses spaced about its periphery, each said recess having a support surface;
location members fixed within said recesses for supporting a cutting insert in said recess;
each of said recesses being provided with a clamping member;
a plurality of cutting inserts each having two opposite end surfaces with side surfaces between them;
a spring-loaded pull rod constituting a tightening member arranged substantially parallel to the axis of the milling cutter clamping each insert by wedging action with an end surface against one of the support surfaces in the recess,
the direction of movement of the clamping members forming an acute angle with the plane of the end surface of the insert, and
each recess also including location members for at least two end faces of the insert, said location members defining the position of the cutting inserts.

References Cited

UNITED STATES PATENTS

| | | | |
|---|---|---|---|
| 2,595,090 | 4/1952 | Middleton | 29—96 |
| 2,641,049 | 6/1953 | Kennicott | 29—96 |
| 2,982,009 | 5/1961 | Swenson | 29—105 |
| 3,217,384 | 11/1965 | Winfelt | 29—105 |
| 3,264,711 | 9/1966 | Gehring | 29—96 |
| 3,499,198 | 3/1970 | Pollard et al. | 29—96 |
| 3,526,025 | 9/1970 | Sletten | 29—95.1 |

FOREIGN PATENTS

| | | |
|---|---|---|
| 209,667 | 6/1960 | Austria. |
| 371,322 | 9/1963 | Switzerland. |
| 184,107 | 7/1966 | U.S.S.R. |

HARRISON L. HINSON, Primary Examiner